United States Patent Office 3,546,085
Patented Dec. 8, 1970

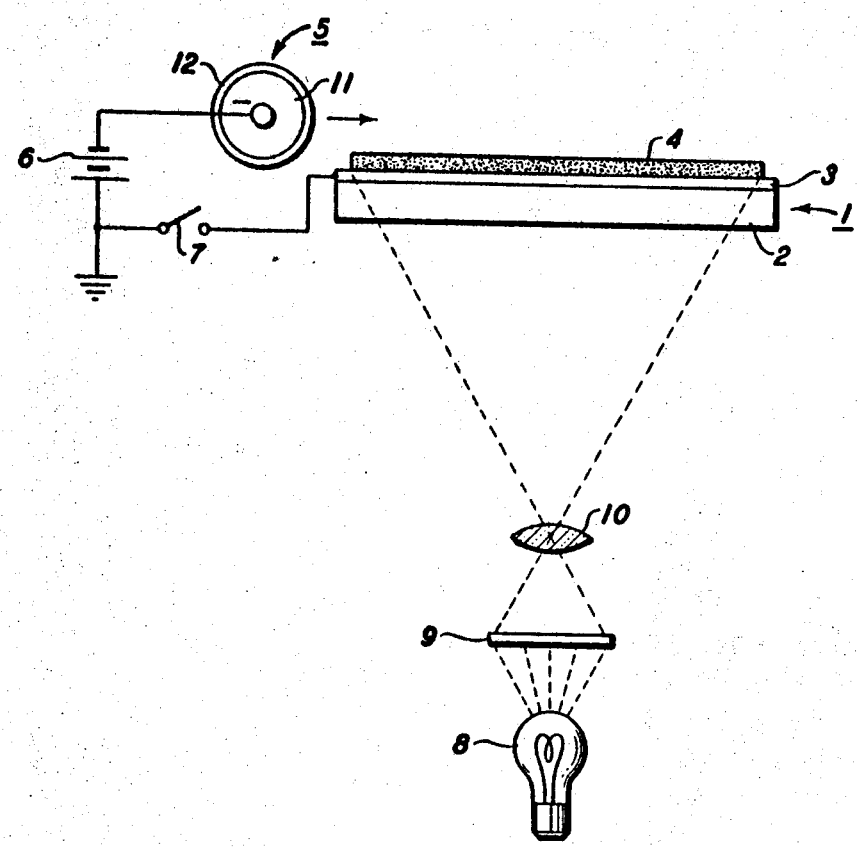

3,546,085
PHOTOELECTROPHORETIC IMAGING PROCESS AND SUSPENSION
Lester Weinberger, Penfield, and Warren E. Solodar, Rochester, N.Y., assignors to Xerox Corporation, Rochester, N.Y., a corporation of New York
Filed Jan. 30, 1967, Ser. No. 612,539
Int. Cl. B01k 5/00
U.S. Cl. 204—181          7 Claims

ABSTRACT OF THE DISCLOSURE

An electrophoretic imaging system which is capable of polychromatic or monochromatic imaging is disclosed, using an at least a portion of the imaging material certain substituted pyrene compounds. A preferred compound is 1,3,6,8-tetracyanopyrene.

---

This invention relates in general to imaging methods. More specifically, the invention concerns the use of electrically photosensitive pigments in electrophoretic imaging systems.

There has been recently developed an electrophoretic imaging system capable of producing color images which utilizes photoconductive particles. This process is described in detail and claimed in copending applications Serial Numbers 384,737 now U.S. Patent No. 3,384,565; 384,681 abandoned in favor of CIP 655,023, now U.S. Patent 3,384,566 and 384,680 abandoned in favor of CIP 518,041, now U.S. Patent 3,383,993. In such an imaging system, various colored light absorbing particles are suspended in a non-conductive liquid carrier. The suspension is placed between electrodes, subjected to a potential difference and exposed to an image. As these steps are completed, selective particle migration takes place in image configuration, providing a visible image at one or both of the electrodes. An essential component of the system is the suspended particles which must be intensely colored and electrically photosensitive and which apparently undergo a net change in charge polarity upon exposure to activating radiation, through interaction with one of the electrodes. The images are produced in color because mixtures of two or more differently colored sets of particles which are each sensitive only to light of a specific wavelength or narrow range of wavelengths are used. Particles used in this system must have both intense pure colors and be highly photosensitive. The pigments of the prior art often lack the purity and brilliance of color, the high degree of photosensitivity, and/or the preferred correlation between the peak spectral response and peak photosensitivity necessary for use in such a system.

It is therefore an object of this invention to provide electrophoretic imaging processes which overcome the above-noted deficiencies.

It is another object of this invention to provide improved electrophoretic imaging suspensions.

It is still another object of this invention to provide novel electrophoretic imaging systems capable of reproducing polychromatic images.

The foregoing objects and others are accomplished in accordance with this invention, fundamentally, by providing novel electrophoretic imaging processes utilizing as a photosensitive component a composition having the general formula:

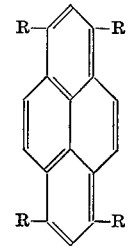

wherein: each R is selected from the group consisting of H, CN, NO$_2$, NH$_2$ and Br; at least two R's being other than H.

These compositions are substituted pyrenes and may be prepared in any conventional manner. Of the compositions within this general formula, those having at least two CN or NO$_2$ groups are preferred, since these have the highest photosensitivity and the purest yellow color. Optimum results have been obtained with 1,3,6,8-tetracyanopyrene.

The use of the above compositions in electrophoretic imaging will be better understood upon reference to the drawing which shows schematically an exemplary electrophoretic imaging system.

Referring now to the figure, there is seen a transparent electrode generally designated 1 which, in this exemplary instance, is made up of a layer of optically transparent glass 2 overcoated with a thin optically transparent layer 3 of tin oxide, commercially available under the name NESA glass. This electrode will hereafter be referred to as the "injecting electrode." Coated on the surface of injecting electrode 1 is a thin layer 4 of finely divided photosensitive particles dispersed in an insulating liquid carrier. The term "photosensitive," for the purposes of this application, refers to the properties of a particle which, once attracted to the injecting electrode, will migrate away from it under the influence of an applied electric field when it is exposed to actinic electromagnetic radiation. For a detailed theoretical explanation of the apparent mechanism of operation of the invention, see the above mentioned copending applications Serial Numbers 384,737; 384,361 and 384,680, the disclosures of which are incorporated herein by reference. Liquid suspension 4 may also contain a sensitizer and/or a binder for the pigment particles which is at least partially soluble in the suspending or carrier liquid as will be explained in greater detail below. Adjacent to the liquid suspension 4 is a second electrode 5, hereinafter called the "blocking electrode," which is connected to one side of the potential source 6 through a switch 7. The opposite side of the potential source 6 is connected to the injecting electrode 1 so that when switch 7 is closed, an electric field is applied across the liquid suspension 4 between electrodes 1 and 5. An image projector made up of a light source 8, a transparency 9, and a lens 10 is provided to expose the dispersion 4 to a light image of the original transparency 9 to be reproduced. Electrode 5 is made in the form of a roller having a conductive central core 11 connected to the potential source 6. The core is covered with a layer of a blocking electrode material 12, which may be Baryta paper. The pigment suspension is exposed to the image to be reproduced while a potential is applied across the blocking and injecting electrodes by closing switch 7.

Roller 5 is caused to roll across the top surface of injecting electrode 1 with switch 7 closed during the period of image exposure. This light exposure causes exposed pigment particles originally attracted to electrode 1 to migrate through the liquid and adhere to the surface of the blocking electrode, leaving behind a pigment image on the injecting electrode surface which is a duplicate of the original transparency 9. After exposure, the relatively volatile carrier liquid evaporates off, leaving behind the pigment image. This pigment image may then be fixed in place as, for example, by placing a lamination over its top surface or by virtue of a dissolved binder material in the carrier liquid such as paraffin wax or other suitable binder that comes out of solution as the carrier liquid evaporates. About 3% to 6% by weight of paraffin binder in the carrier has been found to produce good results. The carrier liquid itself may be paraffin wax or other suitable binder. In the alternative, the pigment image remaining on the injecting electrode may be transferred to another surface and fixed thereon. As explained in greater detail below, this system can produce either monochromatic or polychromatic images depending upon the type and number of pigments suspended in the carrier liquid and the color of light to which this suspension is exposed in the process.

Any suitable insulating liquid may be used as the carrier for the pigment particles in the system. Typical carrier liquids are decane, dodecane, N-tetradecane, paraffin, beeswax or other thermoplastic materials, Sohio Odorless Solvent 3440, (a kerosene fraction available from Standard Oil Company of Ohio) and Isopar-G, (a long chain saturated aliphatic hydrocarbon available from Humble Oil Company of New Jersey). Good quality images have been produced with voltages ranging from 300 to 5,000 volts in the apparatus of the figure.

In a monochromatic system, particles of a single composition are dispersed in the carrier liquid and exposed to a black-and-white image. A single color image results, corresponding to conventional black-and-white photography. In a polychromatic system, the particles are selected so that those of different colors respond to different wave lengths in the visible spectrum corresponding to their principal absorption bands. Also, the pigments should be selected so that their spectral response curves do not have substantial overlap, thus allowing for color separation and subtractive multicolor image formation. In a typical multicolor system, the particle dispersion should include cyan colored particles sensitive mainly to red light, magenta particles sensitive mainly to green light and yellow colored particles sensitive mainly to blue light. When mixed together in a carrier liquid, these particles produce a black appearing liquid. When one or more of the particles are caused to migrate from base electrode 11 toward an upper electrode, they leave behind particles which produce a color equivalent to the color of the impinging light. Thus, for example, red light exposure causes the cyan colored pigment to migrate, leaving behind the magenta and yellow pigments which combine to produce red in the final image. In the same manner, blue and green colors are reproduced by removal of yellow and magenta, respectively. When white light impinges upon the mix, all pigments migrate, leaving behind the color of the white or transparent substrate. No exposure leaves behind all pigments which combine to produce a black image. This is an ideal technique of subtractive color imaging in that the particles are not only each composed of a single component but, in addition, they perform the dual functions of final image colorant and photosensitive medium.

It has been found that the compounds of the general formula given above are surprisingly effective when used in either a single or multicolor electrophoretic imaging system. Their good spectral response and high photosensitivity result in dense, brilliant images. The pigments herein disclosed have surprisingly good color separation and image density characteristics.

Any suitable different colored photosensitive pigment particles having the desired spectral responses may be used with the pigments of this invention to form a pigment mix in a carrier liquid for color imaging. As indicated above, for subtractive polychromatic imaging, the pigments should be yellow, cyan and magenta in color. Any suitable photosensitive cyan and magenta pigments may be used with the yellow pigments of this invention. Typical photosensitive particles include those described in co-pending applications Serial No. 518,041 now U.S. Patent 3,383,993 (filed Jan. 3, 1966), Serial No. 473,607 (filed July 21, 1965) abandoned in favor of CIP Serial No. 737,689 (filed June 17, 1968) and Serial No. 560,603 (filed June 27, 1966). Of these materials, outstanding color balance and separation have been achieved where the magenta particles comprise the calcium salt of 6-bromo-1(1'-sulfo-2'-naphthylazo) - 2 - naphthol or the barium salt of 1(4'-methyl - 5' - chloroazobenzene-2'-sulfonic acid)-2-hydroxy-3-naphthoic acid and the cyan particles comprise metal-free phthalocyanine. These, therefore, are preferred for use with the yellow pigments of this invention in polychromatic imaging.

From about 2 to about 10 percent pigment by weight have been found to produce good results. The addition of small amounts (generally ranging from 0.5 to 5 mol percent) of electron donors or acceptors to the suspensions may impart significant increases in system photosensitivity.

The following examples further specifically define the present invention with respect to the use of the compositions of the general formula given above in electrophoretic imaging processes. Parts and percentages are by weight unless otherwise indicated. The examples below are intended to illustrate various preferred embodiments of the electrophoretic imaging process of the present invention.

All of the following examples are carried out in an apparatus of the general type illustrated in the figure with the imaging mix 4 coated on a NESA glass substrate through which exposure is made. The NESA glass surface is connected in series with a switch, a potential source, and the conductive center of a roller having a coating of Baryta paper on its surface. The roller is approximately 2½ inches in diameter and is moved across the plate surface at about 4 cm. per second. The plate employed is roughly 4 inches square and is exposed with a light intensity of about 4000 ft./candles as measured on the uncoated NESA glass surface. Unless otherwise indicated, 8% by weight of the indicated pigment and each examples is suspended in Sohio Odorless Solvent 3440. All pigments which have a relatively large particle size as received commercially or as synthesized are ground in a ball mill for about 48 hours to reduce their size to provide a more stable dispersion which improves resolution of the final image. In Examples I–VIII, the exposure is made with a 3200° K. lamp through a conventional black-and-white transparency to produce a monochromatic image.

EXAMPLE I

About 8 parts of 1,3,6,8-tetracyanopyrene is suspended in about 100 parts of Sohio Odorless Solvent 3440. The mixture is coated on the NESA glass substrate and a positive potential of about 2500 volts is imposed on the roller electrode. The plate is exposed to a black-and-white image as described above. An excellent image, in yellow on the white or transparent background, conforming to the original, results.

EXAMPLE II

About 8 parts of 1,3-dicyano-6,8-dibromo-pyrene is suspended in about 100 parts of Sohio Odorless Solvent 3440. The mixture is coated on a NESA glass substrate and the plate is exposed as in Example I. An image of good quality results.

EXAMPLE III

About 8 parts of 1,3,6,8-tetraaminopyrene is suspended in about 100 parts of Sohio Odorless Solvent 3440. The mixture is coated onto a NESA glass substrate. The mixture is exposed to a black-and-white original while a positive potential of about 2500 volts is imposed on the roller electrode. A satisfactory image of low density is obtained.

EXAMPLE IV

About 8 parts of 1,3-dinitro-6,8-dicyanopyrene is suspended in about 100 parts Sohio Odorless Solvent 3440. This mixture is coated onto a NESA glass substrate which is exposed as described in Example III. An image of good quality results.

EXAMPLE V

About 8 parts of 1,6-dicyanopyrene is dispersed in about 100 parts Sohio Odorless Solvent 3440. The mixture is coated on a NESA glass substrate and exposed as described above. The potential in this instance is −2500 volts. A good image results.

EXAMPLE VI

About 8 parts of 1,3,6,8-tetrabromopyrene is suspended in about 100 parts of Sohio Odorless Solvent 3440. The suspension is coated onto a NESA glass substrate and imaged as described above. A positive potential of about 2500 volts is maintained on the roller electrode during exposure. A satisfactory image of low density is obtained.

EXAMPLE VII

About 8 parts of 1,3,6,8-tetranitropyrene is suspended in about 100 parts of Sohio Odorless Solvent 3440. The mixture is coated onto a NESA glass substrate and imaged as described above. A positive potential of about 2500 volts is maintained on the roller electrode during imaging. An image of good quality results.

EXAMPLE VIII

About 8 parts of 1-cyano-6-nitropyrene is suspended in about 100 parts of Sohio Odorless Solvent 3440. The suspension is coated on a NESA glass substrate and imaged as described above. A positive potential of about 2500 volts is maintained on the roller electrode during imaging. An image of satisfactory quality results.

In each of Examples IX–XIII, below, a suspension including equal amounts of three different pigments is made up by dispersing the pigments in finely divided form in Sohio Odorless Solvent 3440 so that the pigments constitute about 8% by weight of the mixture. This mixture may be referred to as "tri-mix." The mixtures are individually tested by coating them on a NESA glass substrate and exposing them as in Example I above, except that a multi-color "Kodachrome" transparency is interposed between the light source and the NESA plate instead of the neutral density and Wratten filters. Thus, a multi-colored image is projected on the suspension as the roller moves across the surface of the coated NESA glass substrate. A Baryta paper blocking electrode is employed and the roller is held at a negative potential of about 2500 volts with respect to the substrate. The roller is passed over the substrate six times. The roller is cleaned after each pass. The potential application and exposure are both continued during the entire period of the six passes by the roller.

EXAMPLE IX

The pigment suspension consists of a magenta pigment, watching Red B, the barium salt of 1-(methyl-5′-chloro-azo-benzene-2′-sulfonic acid)-2-hydroxy-3-naphthoic acid, C. I. No. 15865, available from E. I. du Pont de Nemours & Company; a yellow pigment, 1,3,6,8-tetracyanopyrene and a cyan pigment, Monolite Fast Blue GS, the alpha form of metal-free phthalocyanine, C. I. No. 74100, available from the Arnold Hoffman Company. This tri-mix, when exposed to a multi-color image as described above, produces a full color image with excellent density and excellent color separation.

EXAMPLE X

The pigment suspension consists of a magenta pigment, the calcium salt of 6-bromo-1(1′-sulfo-2′-naphthylazo)-2-naphthol; a cyan pigment; monolite Fast Blue GS; and as a yellow pigment, 1,3,6,8-tetracyanopyrene. This tri-mix is exposed as described above, producing an excellent full color image conforming to the original.

EXAMPLE XI

The pigment suspension consists of a magenta pigment, the calcium salt of 6-bromo-1(1′-sulfo-2′-naphthylazo)-2-naphthol; a cyan pigment; Monolite Fast Blue GS, and a yellow pigment, 1,3-dicyano-6,8-dibromopyrene. This tri-mix is exposed to a color original as described above. An image of satisfactory color balance and density results.

EXAMPLE XII

The pigment suspension consists of a magenta pigment, Bonadur Red B, 1-(4′-ethyl-5′-chloroazobenzene-2′-sulfonic acid)-2-hydroxy-3-naphthoic acid calcium lake, available from American Cyanamide; a yellow pigment, 1,6-dicyanopyrene and as a cyan pigment, Cyan Blue XR, the alpha form of copper phthalocyanine, C. I. No. 74160, available from American Cyanamide. This tri-mix is exposed to a multi-color image and produces a full color image of good density and color separation.

EXAMPLE XIII

A pigment suspension is prepared consisting of a magenta pigment, Naphthol Red B, 1-(2′-methoxy-5′-nitrophenylazo)-2-hydroxy-3″-nitro-3-naphthanilide, C. I. No. 12355, available from Collway Colors; a yellow pigment, 1,3,6,8-tetranitropyrene and as a cyan pigment, Cyan Blue GTNF, the beta form of copper phthalocyanine, available from Collway Colors. This tri-mix is exposed to a multi-color image and produces a full color image of satisfactory density and good color separation.

Although specific components and proportions have been described in the above examples relating to the use of phthalocyanines in electrophoretic imaging systems, other suitable phthalocyanines, as listed above, may be used with similar results. In addition, other materials may be added to the pigment compositions or to the pigment-carrier suspensions to synergize, enhance or otherwise modify their properties. For example, the pigments or the suspensions may have electrical or dye sensitizers added if desired.

Other modifications and ramifications of the present invention will occur to those skilled in the art upon a reading of the present disclosure. These are intended to be included within the scope of this invention.

What is claimed is:
1. The method of photoelectrophoretic imaging comprising:
 (a) providing an imaging suspension comprising finely divided electrically photosensitive pigment particles in an insulating carrier liquid;
 (b) exposing said imaging suspension to a pattern of electromagnetic radiation; and
 (c) applying a potential difference across said imaging suspension until an image is formed, said pigment particles comprising a compound having the formula:

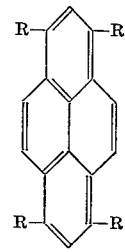

wherein each R is selected from the group consisting of H, CN, NO₂, NH₂ and Br; at least two of said Rs being other than H.

2. The method of claim 1 wherein said compound comprises 1,3,6,8-tetracyanopyrene.

3. The method of claim 1 wherein said potential difference is applied between two electrodes at least one of said electrodes being a transparent conductive electrode and said exposure is directed through said electrode.

4. The method of claim 1 wherein said imaging suspension comprises pigment particles of at least two colors each of said particles having a principal light absorption band which substantially coincides with its principal photosensitive response.

5. An electrophoretic imaging suspension comprising a substantially insulating carrier liquid having dispersed therein a plurality of finely divided particles of at least two different colors, the particles of each color comprising a photosensitive pigment whose principal light absorption band substantially coincides with its principal photosensitive response, the particles of one color comprising a compound having the general formula:

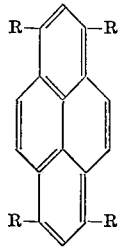

wherein each R is selected from the group consisting of H, CN, NO₂, NH₂ and BR; at least two of said R's being other than H.

6. The suspension of claim 5 wherein said compound comprises 1,3,6,8-tetracyanopyrene.

7. The suspension of claim 5 wherein said particles comprise magenta colored particles primarily responsive to green light, yellow colored particles primarily responsive to blue light and cyan colored particles primarily responsive to red light; said yellow particles comprising 1,3,6,8-tetracyanopyrene, said cyan colored particles comprising metal-free phthalocyanine and said magenta colored particles comprising a compound selected from the group consisting of the calcium salt of 6-bromo-1(1'-sulfo-2'-naphthylazo)-2-naphthol and the barium salt of 1-(4'-methyl 5'-chloroazobenzene-2'-sulfonic acid)-2-hydroxy-3-naphthoic acid.

References Cited
UNITED STATES PATENTS

| | | | |
|---|---|---|---|
| 2,018,935 | 10/1935 | Volmann et al. | 260—396 |
| 2,937,209 | 5/1960 | Studer et al. | 260—396 X |
| 3,252,794 | 5/1966 | Schaum et al. | 96—1.5 |
| 3,287,122 | 11/1966 | Hoegl | 96—1.5 |
| 3,307,940 | 3/1967 | Hoegl et al. | 96—1.5 |
| 3,383,993 | 5/1968 | Yeh | 204—181 X |
| 3,384,565 | 5/1968 | Tulagin et al. | 204—181 |

GEORGE F. LESMES, Primary Examiner

C. E. VAN HORN, Assistant Examiner

U.S. Cl. X.R.

96—1.3, 1.5, 1.2, 88; 260—396